United States Patent
Kazerani et al.

(10) Patent No.: US 10,015,243 B2
(45) Date of Patent: *Jul. 3, 2018

(54) OPTIMIZED CONTENT DISTRIBUTION BASED ON METRICS DERIVED FROM THE END USER

(71) Applicant: Verizon Digital Media Services Inc., Playa Vista, CA (US)

(72) Inventors: Alexander A. Kazerani, Santa Monica, CA (US); Robert J. Peters, Santa Monica, CA (US); Jayson G. Sakata, Encino, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/291,311

(22) Filed: May 30, 2014

(65) Prior Publication Data

US 2014/0280803 A1    Sep. 18, 2014

Related U.S. Application Data

(63) Continuation of application No. 12/873,598, filed on Sep. 1, 2010, now Pat. No. 8,745,128.

(51) Int. Cl.
*H04L 12/721* (2013.01)
*H04L 12/26* (2006.01)
(Continued)

(52) U.S. Cl.
CPC ...... *H04L 67/1036* (2013.01); *H04L 41/5067* (2013.01); *H04L 43/0852* (2013.01); *H04L 61/1511* (2013.01); *H04L 67/101* (2013.01)

(58) Field of Classification Search
CPC ..... H04L 61/1511; H04L 61/35; H04L 61/15; H04L 29/12066; H04L 29/12783;
(Continued)

(56) References Cited

U.S. PATENT DOCUMENTS

| 5,233,604 | A | 8/1993 | Ahmadi et al. |
| 5,732,219 | A | 3/1998 | Blumer et al. |

(Continued)

OTHER PUBLICATIONS

Shaikh, Anees, Renu Tewari, and Mukesh Agrawal. "On the effectiveness of DNS-based server selection." INFOCOM 2001. Twentieth Annual Joint Conference of the IEEE Computer and Communications Societies. Proceedings. IEEE. vol. 3. IEEE, 2001.*

(Continued)

*Primary Examiner* — Ruolei Zong
(74) *Attorney, Agent, or Firm* — Los Angeles Patent Group; Arman Katiraei

(57) ABSTRACT

Some embodiments provide systems and methods for determining a server of a distributed hosting system to optimally distribute content to an end user. The method includes identifying an IP address of the end user. Based on the IP address, a set of servers send packets to the end user to derive performance metrics. The performance metrics are used to determine a server from the set of servers that optimally distributes content to the end user. The method modifies a configuration for resolving end user requests such that the optimal server is identified to the end user when the end user requests content from the hosting system. Some embodiments determine the optimal server by providing downloadable content that is embedded with a monitoring tool. The monitoring tool causes the end user to derive performance metrics for the hosting system when downloading a particular object from a set of servers.

17 Claims, 9 Drawing Sheets

(51) Int. Cl.
*G06F 15/16* (2006.01)
*G06F 15/177* (2006.01)
*G06F 17/00* (2006.01)
*H04L 29/08* (2006.01)
*H04L 12/24* (2006.01)
*H04L 29/12* (2006.01)

(58) Field of Classification Search
CPC ............... H04L 67/1008; H04L 67/101; H04L 67/1036; H04L 63/1408; H04L 43/0852; H04L 41/5067; H04L 43/08; H04L 43/0864; H04L 43/16; H04L 65/80; H04L 67/1002; H04L 67/1021; G06F 17/30864; G06F 17/30861
USPC ................. 709/245, 224, 220, 221, 201–203
See application file for complete search history.

(56) References Cited

U.S. PATENT DOCUMENTS

| | | | |
|---|---|---|---|
| 5,991,735 A | 11/1999 | Gerace | |
| 6,014,660 A | 1/2000 | Lim et al. | |
| 6,108,703 A | 8/2000 | Leighton et al. | |
| 6,130,890 A | 10/2000 | Leinwand et al. | |
| 6,134,592 A | 10/2000 | Montulli | |
| 6,185,598 B1 | 2/2001 | Farber et al. | |
| 6,272,598 B1 | 8/2001 | Arlitt et al. | |
| 6,275,470 B1 | 8/2001 | Ricciulli | |
| 6,415,280 B1 | 7/2002 | Farber et al. | |
| 6,415,368 B1 | 7/2002 | Glance et al. | |
| 6,463,508 B1 | 10/2002 | Wolf et al. | |
| 6,553,413 B1 | 4/2003 | Leighton et al. | |
| 6,728,767 B1 | 4/2004 | Day et al. | |
| 6,829,654 B1 | 12/2004 | Jungck | |
| 6,993,590 B1 | 1/2006 | Gauthier et al. | |
| 7,003,555 B1 | 2/2006 | Jungck | |
| 7,086,061 B1 | 8/2006 | Joshi et al. | |
| 7,103,645 B2 | 9/2006 | Leighton et al. | |
| 7,228,359 B1* | 6/2007 | Monteiro | H04L 29/12066 709/228 |
| 7,254,626 B1* | 8/2007 | Kommula | H04L 67/1008 709/217 |
| 7,340,521 B1* | 3/2008 | Karandikar | H04L 67/02 709/203 |
| 7,523,170 B1* | 4/2009 | Allen | G06F 15/173 709/217 |
| 7,631,098 B2 | 12/2009 | Boutboul et al. | |
| 7,953,887 B2 | 5/2011 | Boss et al. | |
| 8,122,098 B1* | 2/2012 | Richardson | H04L 61/1511 709/217 |
| 2003/0101278 A1 | 5/2003 | Garcia-Luna-Aceves et al. | |
| 2003/0115421 A1 | 6/2003 | McHenry et al. | |
| 2004/0078481 A1 | 4/2004 | Rudd et al. | |
| 2004/0264385 A1* | 12/2004 | Hennessey | H04L 41/12 370/252 |
| 2005/0021863 A1 | 1/2005 | Jungck | |
| 2005/0188073 A1 | 8/2005 | Nakamichi et al. | |
| 2006/0031537 A1 | 2/2006 | Boutboul et al. | |
| 2006/0112170 A1 | 5/2006 | Sirkin | |
| 2007/0233851 A1* | 10/2007 | Ma | H04L 67/1008 709/224 |
| 2008/0139197 A1 | 6/2008 | Misra et al. | |
| 2009/0172192 A1 | 7/2009 | Christian et al. | |
| 2009/0177778 A1 | 7/2009 | Turk | |
| 2009/0210513 A1 | 8/2009 | Boss et al. | |
| 2009/0300208 A1* | 12/2009 | Lepeska | H04L 67/06 709/233 |
| 2010/0125675 A1* | 5/2010 | Richardson | H04L 29/12066 709/242 |
| 2010/0161760 A1* | 6/2010 | Maloo | H04L 29/12066 709/219 |

OTHER PUBLICATIONS

Contavalli, et al., "Client IP information in DNS requests", Internet-Draft document draft-vandergaast-ednsclientip-01, May 21, 2010, 23 pages.

* cited by examiner

|   | 66.102.7.104 | (66.102.7.104), |   |   |   |    |
|---|---|---|---|---|---|---|
| 1 | v249-gw-6 | (68.181.194.65) | 0.787 | 0.702 | 0.632 | ms |
| 2 | lax-dc1--losnettos-dc.cenic.net | (137.164.23.225) | 0.606 | 0.813 | 0.629 | ms |
| 3 | dc-lax-core1--lax-agg1-ge.cenic.net | (137.164.46.105) | 1.05 | 1.047 | 0.859 | ms |
| 4 | dc-lax-peer1--lax-core1-ge-cenic.net | (137.164.46.116) | 0.83 | 1.266 | 3.461 | ms |
| 5 | gi1-1--46.tr01-lsanca01.transitrail.net | (137.164.131.245) | 1.058 | 1.043 | 0.852 | ms |
| 6 | 74.125.49.165 | (74.125.49.165) | 1.047 | 0.973 | 0.845 | ms |
| 7 | 216.239.46.38 | (216.239.46.38) | 1.049 | 0.936 | 0.849 | ms |
| 8 | 64.233.174.70 | (64.233.174.70) | 14.866 | 12.015 | 1.278 | ms |
| 9 | lax04s01-in-f104.1e100.net | (66.102.7.104) | 1.269 | 1.371 | 1.285 | ms |

|   | www.l.google.com | (66.102.7.99), |   |   |   |    |
|---|---|---|---|---|---|---|
| 1 | asw432 | (132.249.20.6) | 0.629 | 0.36 | 0.471 | ms |
| 2 | asw432-gw-3 | (132.249.31.8) | 0.223 | 0.241 | 0.234 | ms |
| 3 | dc-sdg-agg1--sdsc-2.cenic.net | (137.164.23.133) | 0.358 | 0.259 | 0.256 | ms |
| 4 | dc-riv-core1--sdg-agg1-10ge.cenic.net | (137.164.47.111) | 3.588 | 2.998 | 2.985 | ms |
| 5 | dc-lax-core2--riv-core1-1.cenic.net | (137.164.46.245) | 4.731 | 4.62 | 4.606 | ms |
| 6 | dc-lax-peer1--lax-core2-ge-cenic.net | (137.164.46.118) | 4.341 | 4.426 | 4.42 | ms |
| 7 | gi1-1--46.tr01-lsanca01.transitrail.net | (137.164.131.245) | 4.603 | 4.619 | 4.607 | ms |
| 8 | 74.125.49.165 | (74.125.49.165) | 4.606 | 4.542 | 4.468 | ms |
| 9 | 216.239.46.38 | (216.239.46.38) | 4.849 | 4.635 | 4.723 | ms |
| 10 | 64.233.174.70 | (64.233.174.70) | 14.712 | 16.087 | 17.958 | ms |
| 11 | lax04s01-in-f99.1e100.net | (66.102.7.99) | 5.097 | 5.027 | 4.97 | ms |

Figure 6

OPTIMIZED CONTENT DISTRIBUTION BASED ON METRICS DERIVED FROM THE END USER

CLAIM OF BENEFIT TO RELATED APPLICATIONS

This application is a continuation of U.S. nonprovisional application Ser. No. 12/873,598 entitled "Optimized Content Distribution Based on Metrics Derived from the End User", filed Sep. 1, 2010. The contents of application Ser. No. 12/873,598 are hereby incorporated by reference.

TECHNICAL FIELD

The present invention relates to systems and methods for distributing content from a set of servers that are deployed over a wide area data network.

BACKGROUND ART

The Internet is an ever growing collection of digital content. As it continues to grow, so too does the demand for the content. Users depend on the content for their news, entertainment, social networking, business, communications, etc. Efficient delivery of the content to the users is a continually changing problem.

To improve the user experience, content delivery networks (CDNs) have been established to decentralize and localize the distribution of the content to the user. Content from a content provider is distributed over a set of content servers of the CDN. The content servers are geographically positioned at high traffic locations of the data network.

When an end user submits a request for content from the content provider, the content provider responds by sending skeleton content back to the end user. The skeleton content may include a base HyperText Markup Language (HTML), Extensible Markup Language (XML), or Flash page with links to various embedded objects that populate the page with feature-rich content (e.g., videos and images). The embedded objects are hosted on various CDN content servers. The links to the embedded objects resolve to one or more of the CDN content servers that are determined to be closest to the end user. The end user then downloads the embedded objects from these CDN content servers. As a result, the end user downloads content from servers that are geographically closer than the content provider's servers which reduces overall latency and improves the user experience. The CDN further benefits the content provider by providing a cost-effective infrastructure that scales with increased demand without placing burden on the content provider's infrastructure.

Improvements are continually made to the CDN to more efficiently deliver content to the end users. However, the current structure of the Domain Name System (DNS) presents various barriers that have resulted in suboptimal workarounds and assumptions to be made when determining the content server that optimally distributes content to the end user.

FIG. 1 illustrates the DNS structure in order to illustrate these workarounds and assumptions. As shown, the DNS structure includes a recursive name server 110, root name server 120, high-level authoritative name server 130, and low-level authoritative name server 135. Also displayed are content servers 140 and 145 and end users 150 and 155 that are located in different regions 160 and 165.

The recursive name server 110 is located in the first region 160. End user 150 is also located in the first region 160 and is configured to contact the recursive name server 110 to resolve various Internet Protocol (IP) addresses (e.g., 123.456.789.012) from domain names (e.g., www.example.com). End user 155 is located in a second region 165, but is configured to contact the recursive name server 110 in the first region 160 to resolve various IP addresses from domain names. The recursive name server 110 may be a corporate name server that is located in New York and the end user 155 may be an end user of the corporation that is located in a satellite Los Angeles office.

When either of the end users 150 and 155 attempts to resolve an IP address (e.g., www.example.com), a DNS query is sent to the recursive name server 110. In this simplified figure, the recursive name server 110 recursively resolves the IP address from the root to the high-level domain (i.e., example.com) to the low-level domain (i.e., www.example.com). Accordingly, a first DNS query is made from the recursive name server 110 to the root name server 120 to resolve the IP address for www.example.com. The root name server 120 responds to the recursive name server 110 with the IP address for the high-level authoritative name server 130 (i.e., ".com" server). A second DNS query is made from the recursive name server 110 to the high-level authoritative name server 130 to resolve the IP address for www.example.com. The high-level authoritative name server 130 responds to the recursive name server 110 with the IP address for the low-level authoritative name server 135 (i.e., "example.com" server). A third DNS query is made from the recursive name server 110 to the low-level authoritative name server 135 to resolve the IP address for www.example.com. The low-level authoritative name server 135 responds to the recursive name server 110 with the IP address for the content server 140. The recursive name server 110 returns the IP address of the content server 140 to the end users 150 and 155 after which each end user 150 and 155 contacts the content server 140 to download content (e.g., embedded objects).

The low-level authoritative name server 135 identifies the content server 140 by identifying the content server that is geographically closest to the recursive name server 110. In many instances, the low-level authoritative name server 135 makes this determination based on the IP address of the recursive name server 110 since the IP address of the recursive name server 110 is included within the DNS query to the low-level authoritative name server 135.

When a CDN or other provider of content relies on such DNS operation in order to identify content servers, the CDN makes an important assumption that any end users contacting the recursive name server 110 are located in the same region 160 as the recursive name server 110. However, this assumption may be false in some cases when an end user (i.e., end user 155) contacts a remote recursive name server that is located in a different region than the end user. Consequently, the end user ends up receiving content from a content server of a CDN that does not optimally distribute content to the end user relative to other content servers of the CDN.

Accordingly, there is a need to better optimize the routing of end users to content servers. There is a need to remove assumptions as to the locations of the end users in order to more accurately identify the servers that optimally distribute content to the end users. Moreover, the determination from which to identify the optimal servers should include other metrics in addition to or instead of geographic proximity as the closest content server may not optimally deliver content when compared to more distant content servers.

SUMMARY OF THE INVENTION

Some embodiments provide methods and systems for improved distribution of content from a distributed hosting system. The hosting system includes a widely deployed first set of servers that hosts content in a distributed manner and a second set of servers that determines which one or more servers of the first set of servers optimally distribute content to a particular end user. The first set of servers includes content hosting servers (e.g., web servers) and may also include load balancers. The second set of servers includes Domain Name System (DNS) authoritative name servers of the hosting system. The second set of servers seamlessly integrates and operates within the existing DNS server hierarchy. The first and second sets of servers include servers of a content delivery network (CDN), "cloud" service provider, or other provider of distributed content.

In some embodiments, the determination as to which one or more servers of the first set of servers optimally distribute content to a particular end user is based on (i) one or more identification parameters that identify the particular end user and (ii) one or more performance metrics that are derived from the particular end user using the identification parameter. An Internet Protocol (IP) address is one such end user identification parameter.

In some embodiments, the hosting system obtains the end user identification parameter when the user requests content from the hosting system. The end user makes such a request using a DNS query. The DNS query passes from a DNS recursive name server to one or more servers of the second set of servers of the hosting system. In some embodiments, the DNS query includes a modified DNS message that includes the end user IP address. The one or more servers of the second set of servers receiving the modified DNS message extract the end user IP address and provide this identification parameter to a set of one or more monitoring servers of the hosting system. In some embodiments, the set of monitoring servers includes (i) a subset of the first set of servers of the hosting system, (ii) a subset of the second set of servers of the hosting system and/or (iii) other servers of the hosting system that augment functionality of the first and second sets of servers.

The set of monitoring servers derives performance metrics for distributing content to the end user based on the end user identification parameter. From these performance metrics, the set of monitoring servers identifies one or more servers from the first set of servers to optimally distribute content to the end user. A configuration of one or more of the second set of servers or other DNS servers is modified accordingly. Specifically, the configuration is modified such that, when the end user requests content that is hosted by the first set of servers, the request is resolved to identify the server(s) of the first set of servers that optimally distributes content to the end user. In some embodiments, resolving the request includes providing the (i) IP addresses of one or more content servers of the first set of servers that optimally distribute content to the end user, (ii) a load balanced IP address, or (iii) an Anycast IP address. In some embodiments, resolving the request includes providing different IP addresses for a host name, domain name, or sub-domain name that the end user requests when the end user requests content from the hosting system. The resolved addresses are provided to the end user using a DNS response message or other message. In some embodiments, modifying the configuration includes modifying a DNS table, configuration file, or other routing table of the second set of servers that is used to generate the DNS response message or other messages that identify the optimal server(s) to an end user when the end user requests content from the hosting system.

To derive the end user performance metrics, some embodiments actively monitor performance from the set of monitoring servers to the end user. Specifically, each server of the set of monitoring servers sends packets to the end user based on the identification parameter (e.g., IP address) of the end user. Each server may utilize one or more monitoring tools (i) to measure the performance when sending the packets to the end user and (ii) to derive the performance metrics from the measurements. The derived performance metrics include measurements of proximity, latency, cost, time of day, traffic patterns, route congestion, and load on the content servers as some examples. In this manner, the hosting system derives performance metrics for delivering content directly to the end user instead of an intermediary such as a recursive name server.

In some embodiments, the set of monitoring servers intelligently clusters groups of end users. In some instances, end users within a particular block of IP addresses are grouped in a cluster (e.g., a particular class C block of IP addresses). In some other instances, end users that obtain content through a particular intersection point in the data network are identified and grouped in a cluster. By clustering end users, the set of monitoring servers can reduce the monitoring load on the hosting system and on the end users. Rather than derive performance metrics for each end user of a particular cluster, the set of monitoring servers can derive performance metrics for a subset (i.e., one or more) of the end users of a particular cluster or for an intersection point shared by the end users of a particular cluster. Routing decisions for each end user of the cluster can then be based on the performance metrics that are derived for the cluster.

Clustering allows the hosting system to optimally distribute content to first time end users that can be grouped to a particular cluster, but that have not been previously identified by hosting system. Additionally, the hosting system can vary the sampling within a cluster so that performance metrics are obtained for the cluster even when certain end users of the cluster are intermittently connected to the network.

In some embodiments, the determination as to which one or more servers of the first set of servers optimally distribute content to an end user is based on performance metrics that are passively derived from the end user. In some such embodiments, a hosting system monitoring tool is embedded within content that is distributed to the end user by a content provider, subset of the first set of servers, or set of monitoring servers. Once the end user downloads and processes such content, the hosting system monitoring tool is executed locally on the end user machine.

When executed, the hosting system monitoring tool causes the end user to download a particular common object (also referred to as a beacon object) from multiple servers of the hosting system. In so doing, the end user derives various performance metrics for downloading the common object from the multiple servers. The monitoring tool then causes the end user to send the performance metrics back to the hosting system. The performance metrics are sent in addition with other information such as the end user identification parameter (e.g., end user IP address) and identification parameters of the servers from which the common object was downloaded.

The end user derived performance metrics are received at one or more monitoring servers. These performance metrics may be aggregated independent of or in addition to the performance metrics that are derived through active monitoring of the end user. The performance metrics are then analyzed (i) to identify which server of the first set of servers optimally distributes content to the end user and (ii) to modify configurations of the second set of servers accordingly.

BRIEF DESCRIPTION OF THE DRAWINGS

In order to achieve a better understanding of the nature of the present invention, a preferred embodiment of the hosting system will now be described, by way of example only, with reference to the accompanying drawings in which:

FIG. 6 illustrates clustering based on intersection points in accordance with some embodiments.

DETAILED DESCRIPTION

In the following detailed description, numerous details, examples, and embodiments of the hosting system are set forth and described. It will be clear and apparent to one skilled in the art that hosting system is not limited to the embodiments set forth and that the hosting system may be practiced without some of the specific details and examples discussed.

I. Hosting System

Figure 1:
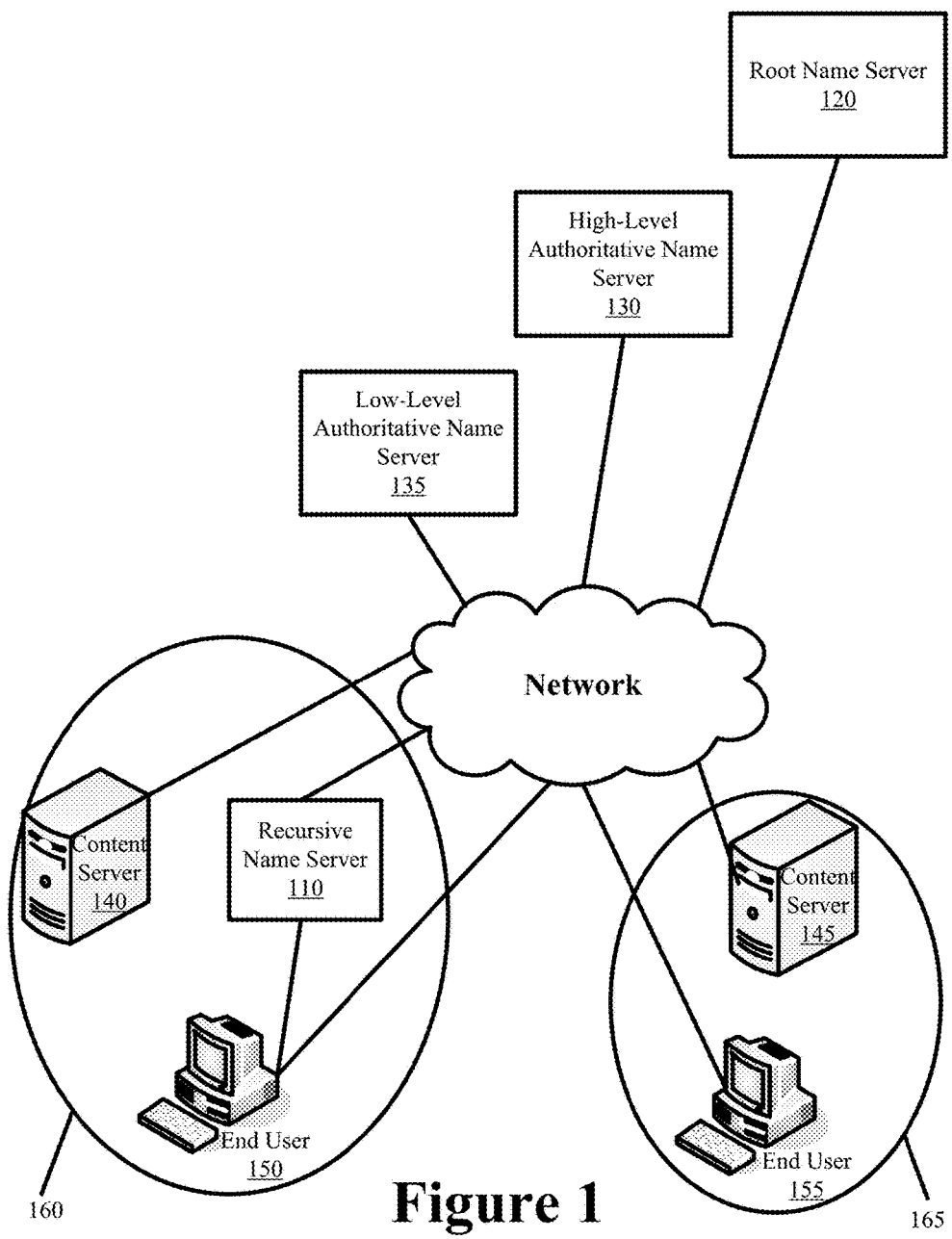
FIG. 1 illustrates the DNS structure in order to illustrate various workarounds and assumptions utilized by content providers.
Figure 2:
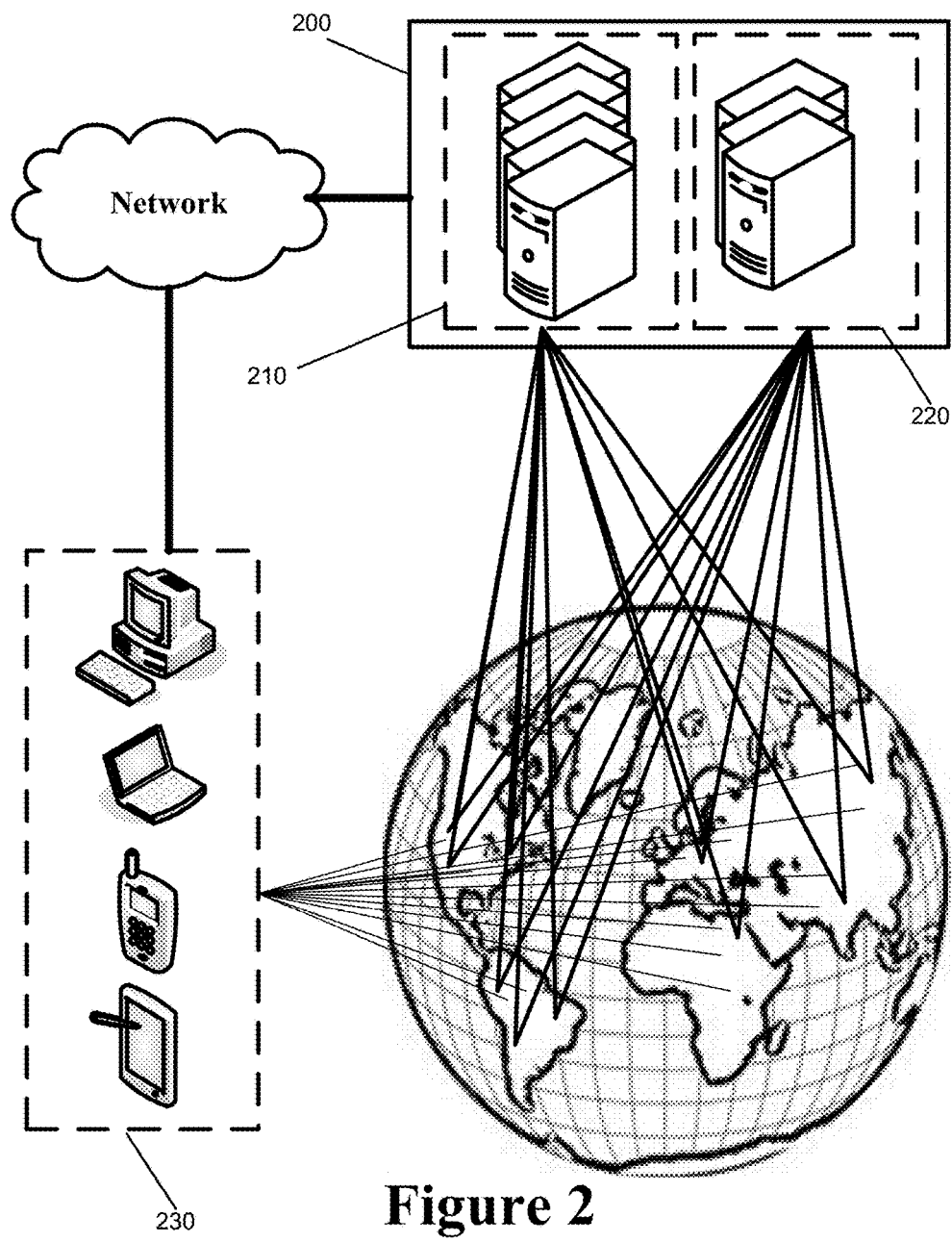
FIG. 2 illustrates components of the distributed hosting system in accordance with some embodiments.

Some embodiments provide methods and systems for improved distribution of content from a distributed hosting system. FIG. 2 illustrates components of the distributed hosting system 200 in accordance with some embodiments. The hosting system 200 includes a widely deployed first set of servers 210 and a second set of servers 220 that together optimally distribute content to end users 230. The optimal distribution of content to a particular end user involves distributing content from one or more servers of the first set of servers that provide the most overall efficient delivery of the content to the particular end user.

In some embodiments, the one or more servers of the first set of servers 210 that optimally distribute content to a particular end user are determined based on various performance metrics that are derived from the particular end user. The performance metrics include one or more measurements of proximity, latency, cost, time of day, traffic patterns, route congestion, and load on the first set of servers as some examples. As used herein, a server includes (i) an independent physical computing machine or device of the hosting system 200 with a processor, memory, storage, and network connectivity and (ii) a virtual machine that runs in conjunction with other virtual machines on a single or distributed set of physical computing machines or devices, wherein each virtual machine is provided exclusive or shared access to a particular set of computing resources (e.g., processor, memory, storage, etc.) of the physical computing machines or devices.

The first set of servers 210 includes web, database, advertisement, or other content servers. These servers 210 host content from multiple different content providers in a distributed manner. For example, a first set of content for a particular website may be hosted by a first server of the first set of servers 210 and a second set of content for the particular website may be hosted by a second server of the first set of servers 210. The content hosted by the first set of servers 210 includes graphics, videos, audio, text, files, and other digital data that can be embedded within websites or passed over a data network. The first set of servers 210 may also include one or more load balancers. The load balancers distribute end users over the content servers of the first set of servers 210 so as to prevent bottlenecks from occurring at any particular content server.

Each server of the first set of servers 210 is placed at a specific location within various geographic regions. The specific locations include high traffic locations of the Internet (e.g., primary Internet exchange points) or other data networks. Each region may cover one or more municipalities, cities, states, countries, or areas. In some embodiments, a server of the first set of servers 210 represents one or more servers of a datacenter at a particular geographic location.

The second set of servers 220 determines which one or more servers of the first set of servers 210 distribute content to a particular end user. More specifically, the second set of servers 220 determines the optimal one or more servers of the first set of servers 210 to distribute content to the particular end user based on various performance metrics that are derived from the particular end user.

The second set of servers 220 includes Domain Name System (DNS) authoritative name servers. The authoritative name servers may include high-level authoritative name servers (e.g., example.com) and low-level authoritative name servers (e.g., www.example.com). The second set of servers 220 seamlessly integrates and operates within the existing DNS server hierarchy. It should be apparent to one of ordinary skill in the art that in some embodiments additional authoritative name servers may be provided for different hosting systems with different hierarchical configurations (e.g., www.first.second.example.com).

Each particular server of the second set of servers 220 is configured using configuration information that is stored within one or more DNS tables, configuration files, or other routing tables of the particular server. Based on the configuration information, the second set of servers 220 generates DNS response messages or other messages to send to the end users in order to identify the one or more servers of the first set of servers 210 that optimally distribute content to the end users when the end users request content from the hosting system 200. The configuration of the second set of servers 220 is continually updated based on the performance metrics that are derived from the end users.

The first and second sets of servers 210 and 220 of the hosting system 200 include servers of a content delivery network (CDN), "cloud" service provider, or other provider of distributed content. The figures and description provided hereafter are presented relative to a CDN. However, it should be apparent to one of ordinary skill that these embodiments are applicable to any provider of distributed content. It should further be apparent that the hosting system 200 may include additional servers or functionality to augment the functionality of the first and second sets of servers 210 and 220.

The end users 230 include any electronic device or computing machine with network connectivity. These devices or machines include cellular telephones, smartphones such as the iPhone®, tablet devices such as the iPad™, portable digital assistants (PDAs), notebook computing systems, laptop computing systems, and desktop computing systems as some examples.

In some embodiments, the second set of servers 220 identifies which one or more servers of the first set of servers 210 optimally distribute content to a particular end user based on (i) one or more identification parameters that identify the particular end user and (ii) one or more performance metrics that are derived from the particular end user using the identification parameter. An Internet Protocol (IP) address is one such end user identification parameter. A Media Access Control (MAC) address is another such end user identification parameter that may be used in addition to or instead of the end user IP address.

In some embodiments, a particular server of the second set of servers 220 obtains end user identification parameters for a particular end user when the end user requests content from the hosting system 200. To request content, the end user submits a DNS query. The DNS query passes from a DNS recursive name server to the particular server of the second set of servers 220. In some embodiments, the DNS query is performed using a modified DNS message. The modified DNS message includes the end user IP address which may either be an IPv4 or IPv6 address. An example of such a modified DNS message is described within the Internet-Draft document entitled "Client IP information in DNS requests" authored by C. Contavalli, et al. This document defines an Extension mechanism for DNS (EDNS) that carries the end user IP address within the DNS message as the DNS message passes from the end user to a recursive name server to an authoritative name server (i.e., a server of the second set of servers 220). In some embodiments, other means are used to obtain the end user identification parameters. For example, a reverse DNS lookup may be used to obtain the end user identification parameters.

The one or more servers of the second set of servers that receive a modified DNS message extract the end user identification parameter (i.e., IP address) from the modified DNS message. The extracted end user identification parameter is passed to a set of one or more monitoring servers of the hosting system.

In some embodiments, the set of monitoring servers includes a subset of the first set of servers or a subset of the second set of servers of the hosting system. In some such embodiments, the first and second sets of servers are enhanced to execute processes for deriving, aggregating, and analyzing the performance metrics as will be described in greater detail below.

In some embodiments, the set of monitoring servers includes servers of the hosting system that augment functionality of the first and second sets of servers. In some such embodiments, the monitoring servers operate to derive, aggregate, and analyze performance metrics on behalf of the first set of servers. Each such monitoring server is therefore related to a particular server of the first set of servers and can be used to enhance the functionality of the particular server or provide additional services (e.g., monitoring and deriving performance metrics) for the particular server without impacting the functionality or operation of the particular server. The monitoring servers may include (i) separate physical machines that are located at the same or nearby locations as the first set of servers or (ii) virtual machines that run on the same physical machine that runs a virtual machine server of the first set of servers.

Based on the extracted end user identification parameters, the set of monitoring servers of some embodiments distributes content to the end user and derives performance metrics that are related to the distribution of content from the monitoring server to the end user. In this manner, the set of monitoring servers actively monitor performance directly to the end user.

In some embodiments, the determination as to which one or more servers of the first set of servers optimally distribute content to a particular end user is based on performance metrics that are passively derived from the end users. Specifically, a set of monitoring servers aggregates performance metrics that different end users send to the set of monitoring servers as the end users download content from the hosting system.

In some embodiments, the performance metrics that are derived from actively monitoring end users is analyzed independent of or in conjunction with the passively derived performance metrics. The performance metrics are analyzed to identify the one or more servers of the first set of servers that optimally distribute content to one or more end users. Based on the analysis, the configuration of one or more servers of the second set of servers or other DNS servers is modified. Specifically, the configuration is modified such that, when an end user requests content that is hosted by the first set of servers, the request is resolved to identify the server(s) of the first set of servers that optimally distributes content to the end user. In some embodiments, resolving the request includes providing the (i) IP addresses of one or more content servers of the first set of servers that optimally distribute content to the end user, (ii) a load balanced IP address, or (iii) an Anycast IP address. In some embodiments, resolving the request includes providing different IP addresses for a host name, domain name, or sub-domain name that the end user requests when the end user requests content from the hosting system. The resolved addresses are provided to the end user using a DNS response message or other message. In some embodiments, modifying the configuration includes modifying a DNS table, configuration file, or other routing table of the second set of servers that is used to generate the DNS response message or other messages that identify the optimal server(s) to an end user when the end user requests content from the hosting system.

II. Active Monitoring

Figure 3:
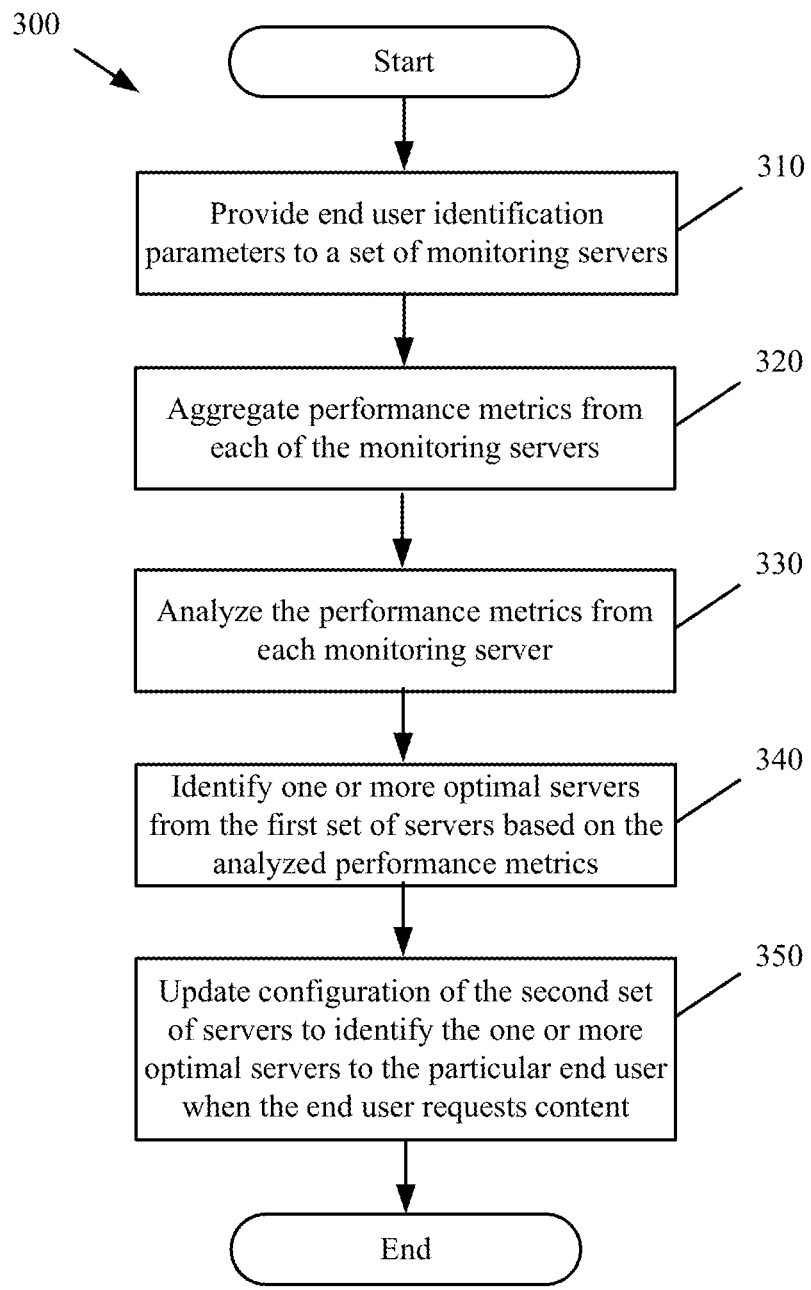
FIG. 3 presents a process performed by the hosting system for identifying the one or more optimal servers based on performance metrics derived from actively monitoring a particular end user in accordance with some embodiments.
Figure 4:
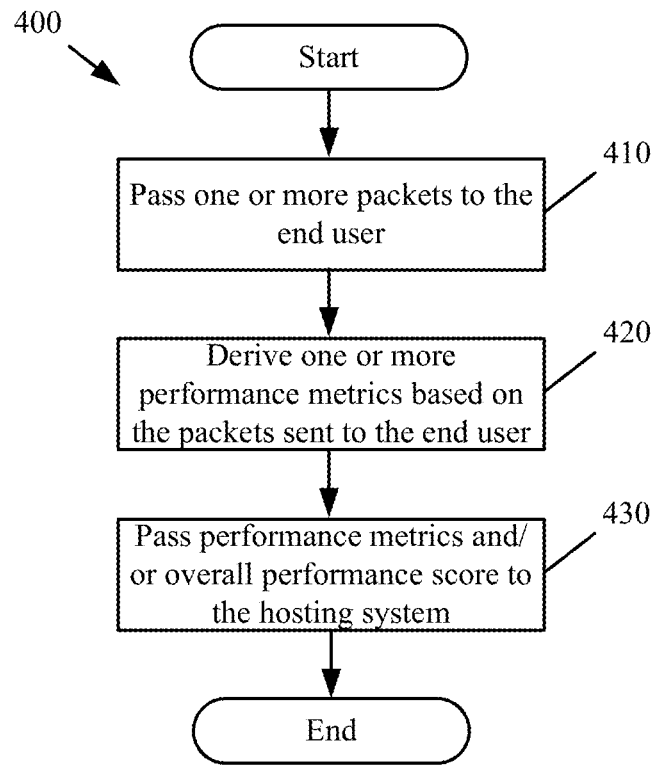
FIG. 4 presents a process performed by each server in the subset of first servers to derive the end user performance metrics based on active monitoring of the particular end users in accordance with some embodiments.

FIGS. 3 and 4 present processes for identifying one or more servers of the hosting system to optimally distribute content to a particular end user based on active monitoring of the particular end user. Specifically, FIG. 3 presents a process 300 performed by the hosting system for identifying the one or more optimal servers based on performance metrics that are derived from actively monitoring a particular end user in accordance with some embodiments. The process 300 begins when one or more identification parameters (e.g., end user IP address) of the particular end user are obtained by at least one server of the second set of servers. The end user identification parameters may be obtained from the modified DNS message as described above.

The end user identification parameters are provided (at 310) to a set of monitoring servers in order for the set of monitoring servers to derive the end user performance metrics in the manner described below with reference to FIG. 4. In some embodiments, the set of monitoring servers is identified based on the end user identification parameters. For example, using publicly available information, such as IP address map lookup tables, the hosting system can identify a set of monitoring servers that are geographically closest to an end user based on the extracted IP address of the end user.

The process aggregates (at 320) the end user performance metrics from each of the monitoring servers. In some embodiments, the end user performance metrics are aggregated at (i) a particular monitoring server of the set of monitoring servers, (ii) one or more servers of the second set of servers, (iii) a database of the hosting system, or (iv) at a central management site of the hosting system.

The process analyzes (at 330) the aggregated end user performance metrics. In some embodiments, analyzing the performance metrics involves computing an overall performance score for each set of derived performance metrics that are provided by each particular server in the set of monitoring servers. Each set of performance metrics that are provided by a monitoring server is used to analyze content distribution performance from a particular server of the first set of servers to a particular end user where the monitoring server (i) is the particular server of the first set of servers that is enhanced to derive and/or analyze the performance metrics or (ii) is a separate server that is linked to and that operates to augment functionality of the particular server by deriving and/or analyzing performance metrics for the particular server.

When analyzing the performance metrics, different performance metrics may be weighted equally. Alternatively, different performance metrics may be weighted disproportionately so that one performance metric (e.g., latency) is valued more than another metric (e.g., proximity). For example, the hosting system can value a server that distributes content to an end user with lower latency greater than a server that distributes content to the end user from a closer geographic position.

Based on the performance metric analysis, the process identifies (at 340) one or more servers of the first set of servers that optimally distribute content to the particular end user. In some embodiments, the identified optimal servers are ordered with respect to performance such that there is a primary optimal server, secondary optimal server, etc. for distributing content to the particular end user. Such ordering provides redundancy so that the end user receives content from a secondary server when the primary server is unavailable. Such ordering also allows content to be partitioned over multiple servers such that each of the multiple servers can distribute a portion of the content in order to minimize the load on any particular server.

Next, the process updates (at 350) the configuration of one or more of the second set of servers such that the servers that optimally distribute content to the particular end user are resolved and identified to the particular end user when the particular end user requests content from the hosting system. The updates may also be made to other DNS servers of the DNS server hierarchy.

In some embodiments, the process 300 is continually or periodically run to determine whether changes in the network cause the one or more optimal content servers to change for the particular end user. If so, the server configurations are updated to identify different optimal content servers.

FIG. 4 presents a process 400 performed by each monitoring server in the set of monitoring servers to derive the end user performance metrics based on active monitoring of end users in accordance with some embodiments. The process 400 is performed for end users with IPv4 addresses and end users with IPv6 addresses. The process 400 begins when a monitoring server is provided with the identification parameters (i.e., step 310 of FIG. 3) of a particular end user.

Based on the identification parameters, the monitoring server passes (at 410) one or more packets to the particular end user. In some embodiments, the packets include Internet Control Message Protocol (ICMP) echo request packets to ping the particular end user or packets with variable Time To Live (TTL) parameters to trace the route to the particular end user. The monitoring server derives (at 420) one or more performance metrics based on the packets that are sent to the particular end user. As noted above, these performance metrics include metrics for latency, proximity, and cost as some examples. Other performance metrics may be derived based on the impact that network parameters have on distributing the content to the particular end user. In some embodiments, the network parameters include the time of day, traffic patterns, loads on the server, and different available routes to the particular end user. For instance, a first route to a particular end user may be the optimal route during daytime hours and a second route to the particular end user may be the optimal route during nighttime hours. As another example, when sending content from a server in Los Angeles to a particular end user in San Francisco, a route that is provided by a first service provider may be optimal compared to a different route that is provided by a second service provider. However, the route of the second service provider may be optimal as compared to the route of the first service provider (e.g., less latency) when sending content from the server in Los Angeles to a particular end user in San Jose.

In some embodiments, the performance metrics are derived using scripts or network performance monitoring tools. Some such network performance monitoring tools include ping and traceroute as some examples. In some embodiments, an overall performance score may be computed for the performance metrics at the monitoring server. The overall score quantifies the various performance metrics to a numeric value.

The process passes (at 430) the performance metrics and/or overall performance score to the hosting system for analysis and the process ends. The performance metrics may be passed to a particular monitoring server, one or more of the second set of servers, a database of the hosting system, or a central management site of the hosting system. Each particular monitoring server of a set of monitoring servers that monitors the particular end user performs the process 400. As a result, different sets of performance metrics are aggregated from the different monitoring servers. The performance metrics are compared relative to one another in order to identify the content server of the first set of servers that optimally distributes content to the end user. Once identified, step 350 of FIG. 3 is performed to update the configuration of one or more of the second set of servers such that a content request from a particular end user is resolved to identify the optimal server for that particular end user.

In some embodiments, each server in the set of monitoring servers periodically or continuously performs the process 400 for each end user that the server has identification parameters for. In this manner, the hosting system continually updates the performance metrics such that network failures, downed links, etc. are accounted for and the identified server for optimally distributing content to the end user is up-to-date irrespective of such failures. A further advantage is that the hosting system, more specifically the set of monitoring servers, derives the performance metrics directly from the end user. This is in contrast to many current CDNs and distributed content providers that rely on performance metrics that are derived from intermediaries such as recursive name servers. Such CDNs and distributed content providers make assumptions as to locations of the end users that contact the recursive name servers. Such CDNs and distributed content providers are more likely to provide suboptimal distribution of content to the end users. Additional advantages of the hosting system of some embodiments include determining the one or more optimal servers from multiple performance metrics (e.g., latency, proximity, cost, time of day, etc.). This is in contrast to other CDNs and content providers that base decisions on a single factor such as latency or proximity.

To reduce the monitoring load on the monitoring servers and on the end users, some embodiments group end users into different clusters. Once grouped in a cluster, the monitoring servers actively monitor for the cluster rather than monitor each individual end user of the cluster.

Figure 5:
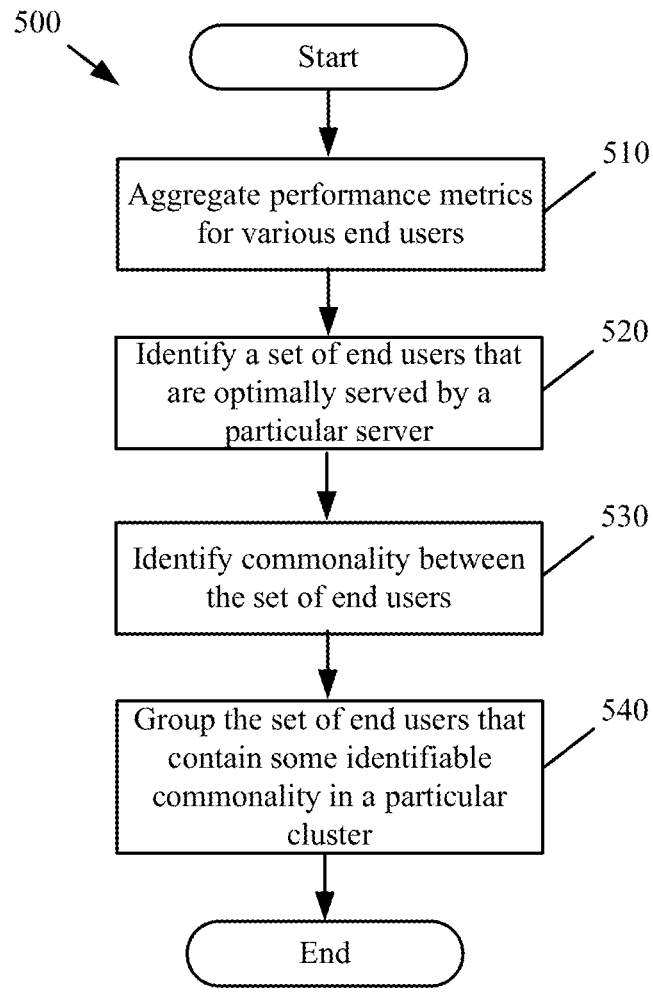
FIG. 5 presents a process for grouping end users in clusters in accordance with some embodiments.

FIG. 5 presents a process 500 for grouping end users in clusters in accordance with some embodiments. The process 500 begins by aggregating (at 510) performance metrics for various end users. Based on the performance metrics, the process identifies (at 520) a set of end users that are optimally served by a particular server. Next, the process identifies (at 530) commonality between the set of end users that are optimally served by the particular server. Commonality may include end users that are geographically close to one another, end users within a particular block of IP addresses (e.g., a particular class C block of IP addresses), or end users that receive content through a common intersection point in the network. Other commonality may be identified in some other embodiments. The process groups (at 540) the set of end users that contain some identifiable commonality in a particular cluster and the process ends.

The process 500 may be repeated for different sets of end users that are optimally served by different servers. Several statistical clustering algorithms currently exist to identify commonality between the different end users. Some such algorithms may be used to perform step 530 when performance metrics for the set of end users are provided as input.

In some embodiments, the clusters are dynamic. For example, a particular end user may be grouped in a first cluster during daytime hours and grouped in a second cluster during nighttime hours because of changing traffic patterns throughout day.

Once a cluster is determined, the monitoring servers can update the server that optimally distributes content for each end user of the cluster by monitoring a sample set of end users of the cluster (e.g., IP addresses for one or more end users of the cluster) or by monitoring an identification parameter of the cluster (e.g., an IP address of an intersection point). The monitoring servers can vary the sampling within a cluster so that performance metrics are obtained for the cluster even when certain end users of the cluster are intermittently connected to the network. In this manner, the optimal server is kept up to date even when certain users of the cluster cannot be monitored. In some embodiments, the monitoring servers actively monitor a cluster to derive performance metrics for the cluster using process 400 or a similar such process.

Clustering allows the hosting system to optimally distribute content to a first time end user even when performance metrics have not been derived for the first time end user. For example, the set of monitoring servers derives performance metrics for multiple end users and determines that the end users are each optimally served by a particular server of the first set of servers. The set of monitoring servers identifies that each such end user has an IP address that is within a particular class C block of IP addresses. Accordingly, the end users are grouped in a particular cluster. All other end users having an IP address within the particular class C block can also be grouped in the particular cluster without having to derive performance metrics for those end users. As a result, the set of monitoring servers identifies an optimal server for any subsequent user with an IP address in the particular class C block even when performance metrics have not been derived for that end user.

The clustering of the hosting system can be more specific when needed. For example, the set of monitoring servers clusters end users having IP addresses in the range of 1.1.1.1-1.1.1.10 when performance metrics derived from a subset of IP addresses in the range (e.g., 1.1.1.1, 1.1.1.3, 1.1.1.9, and 1.1.1.10) identify the same server to optimally distribute content.

In some embodiments, end users are clustered based on intersection points within the network. Specifically, when performing traceroutes to the end users, the set of monitoring servers identifies one common network node from which content passes to multiple end users. Such a network node is an intersection point that can be used to group end users in a cluster. Performance metrics are derived for the intersection point rather than for each end user of the cluster. Based on the intersection point derived performance metrics, the set of monitoring servers can determine the server that optimally distributes content to each of the end users in the cluster.

FIG. 6 illustrates clustering based on intersection points in accordance with some embodiments. In this figure, traceroutes are performed from two different monitoring servers to two different end users 610 and 620. As shown, the routes to the end users 610 and 620 from either server pass through a common set of nodes or intersection points 630. In some such embodiments, the monitoring servers actively monitor the first intersection point 640 rather than actively monitor each of the end users 610 and 620 in order to derive performance metrics for the intersection point 640. The optimal server that is determined from these performance metrics will be the same server as the optimal server that is determined from performance metrics that are derived directly from the end users 610 and 620. This is because any content that is distributed from the servers to the end users 610 and 620 will pass through the intersection point 640 to arrive at the end users 610 and 620. Therefore, determining the optimal server to the intersection point 640 is, in this figure, equivalent to determining the optimal server to the end users 610 and 620.

III. Passive Monitoring

Some embodiments passively derive the end user performance metrics. In some such embodiments, the end user derives the performance metrics and sends the performance metrics to one or more monitoring servers of the hosting system. The performance metrics are analyzed by the monitoring servers to determine the one or more servers of the first set of servers for optimally distributing content to the end user.

Figure 7:
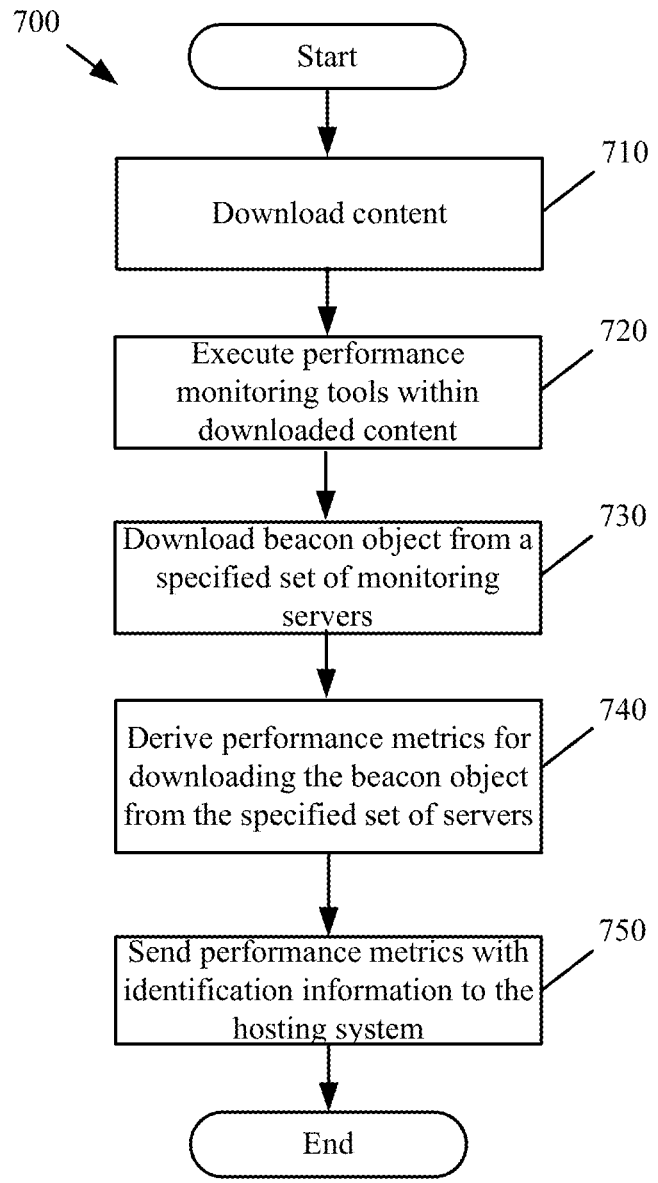
FIG. 7 presents a process performed by an end user that is passively monitored by the hosting system in accordance with some embodiments.

FIG. 7 presents a process 700 performed by an end user that is passively monitored by the hosting system in accordance with some embodiments. The process 700 begins when the end user downloads (at 710) content from any monitoring server of the hosting system that may include one or more servers of the first set of servers. In some embodiments, the process 700 begins when the end user downloads skeleton content from a content provider (e.g., a base HyperText Markup Language (HTML), Extensible Markup Language (XML), or Flash page) with links to embedded objects that are hosted by the first set of servers of the hosting system.

Embedded within the downloaded content are one or more hosting system monitoring tools. In some embodiments, the hosting system monitoring tools are implemented as scripts (e.g., JavaScript). In some embodiments, the hosting system monitoring tools are embedded with the permission of the content provider. Once the end user downloads and processes the content, the hosting system monitoring tools are executed (at 720) locally on the end user.

When executed, the hosting system monitoring tools cause the end user to download (at 730) a particular common object from a specified set of monitoring servers. The particular common object is also referred to as a beacon object. The beacon object may be a random data file on the order of a few bytes in size.

The monitoring servers from which the particular beacon object is downloaded may be dynamically provisioned. For instance, when the end user submits the request for content, the hosting system or the content provider on-the-fly determines which servers to include in the set of monitoring servers. Before distributing the content to the end user, the one or more embedded hosting system monitoring tools are updated to cause the end user to download the beacon object from the determined set of monitoring servers. In some embodiments, the set of monitoring servers are determined based on preexisting or previously acquired information such as network maps that identify which monitoring servers are geographically closest to the end user. In some embodiments, the hosting system monitoring tools cause the end user to download the particular beacon object from the same monitoring server through different network routes.

Next, the end user derives (at 740) various performance metrics for downloading the beacon object from the specified set of monitoring servers. To compute the various performance metrics, the end user may utilize performance monitoring tools such as ping and traceroute. Alternatively, the script of the hosting system monitoring tool may provide the means for deriving the performance metrics.

The performance metrics are sent (at 750) to the hosting system. In some embodiments, the end user sends other information such as an identification parameter of the end user (e.g., end user IP address) and an identification parameter (e.g., IP addresses) for each of the monitoring servers from which the beacon object was downloaded. In some embodiments, the end user sends the performance metrics and other information as a text file or as a bit encoded file to the hosting system. In some embodiments, the performance metrics and other information are sent to (i) one or more monitoring servers that may include one or more servers of the first set of servers or one or more servers of the second set of servers, (ii) a database of the hosting system, or (iii) a central management site of the hosting system.

Figure 8:
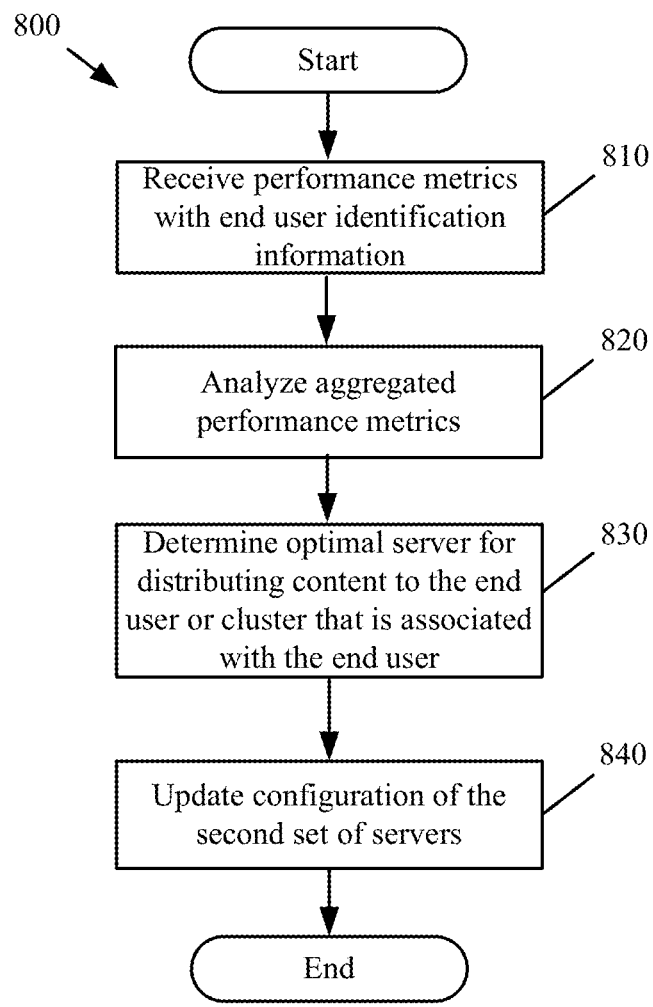
FIG. 8 presents a process performed by the hosting system to determine optimal servers for distributing content based on the performance metrics that are provided by the passively monitored end users in accordance with some embodiments.

FIG. 8 presents a process 800 performed by the hosting system to determine one or more servers for optimally distributing content based on the performance metrics that are provided by passively monitored end users in accordance with some embodiments. The process 800 begins when an end user sends performance metrics to the hosting system.

The process receives (at 810) the performance metrics with the end user identification parameter. Optionally, the process computes an overall performance score based on the performance metrics. The process analyzes (at 820) the performance metrics to determine (at 830) one or more servers for optimally distributing content to the end user. The configuration of the second set of servers is updated (at 840) such that a content request from a particular end user is resolved to identify the optimal server for that particular end user. In some embodiments, the configurations of other DNS servers in the DNS server hierarchy are also updated. As noted above, the configurations are modified such that, when the end user requests content that is hosted by the first set of servers, the request is resolved to identify the (i) IP addresses of one or more content servers of the first set of servers that optimally distribute content to the end user, (ii) a load balanced IP address, or (iii) an Anycast IP address. In some embodiments, resolving the request includes identifying different IP addresses for a host name, domain name, or sub-domain name that the end user requests when the end user requests content from the hosting system. The resolved addresses are provided to the end user using a DNS response message or other message.

In some embodiments, the analysis at step 820 is performed in conjunction with performance metrics that are derived from actively monitoring the end user. Accordingly, it should be apparent to one of ordinary skill in the art that passive monitoring may be performed independent of or in conjunction with active monitoring. Furthermore, the end user provided performance metrics may be used to facilitate clustering. For example, the passively derived performance metrics can be used to identify a cluster from which the one or more optimal servers can be identified without further analysis of the performance metrics. The performance metrics may also be used to update the one or more optimal servers identified for a particular cluster. In some embodiments, the passive monitoring is performed by end users with IPv4 addresses and end users with IPv6 addresses.

IV. Computer System

Many of the above-described processes and modules are implemented as software processes that are specified as a set of instructions recorded on a non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer, server, and computer system are meant in their broadest sense, and can include any electronic device with a processor including cellular telephones, smartphones, portable digital assistants, tablet devices, laptops, notebooks, servers, and desktop computers. Examples of computer readable media include, but are not limited to, CD-ROMs, flash drives, RAM chips, hard drives, EPROMs, etc.

Figure 9:
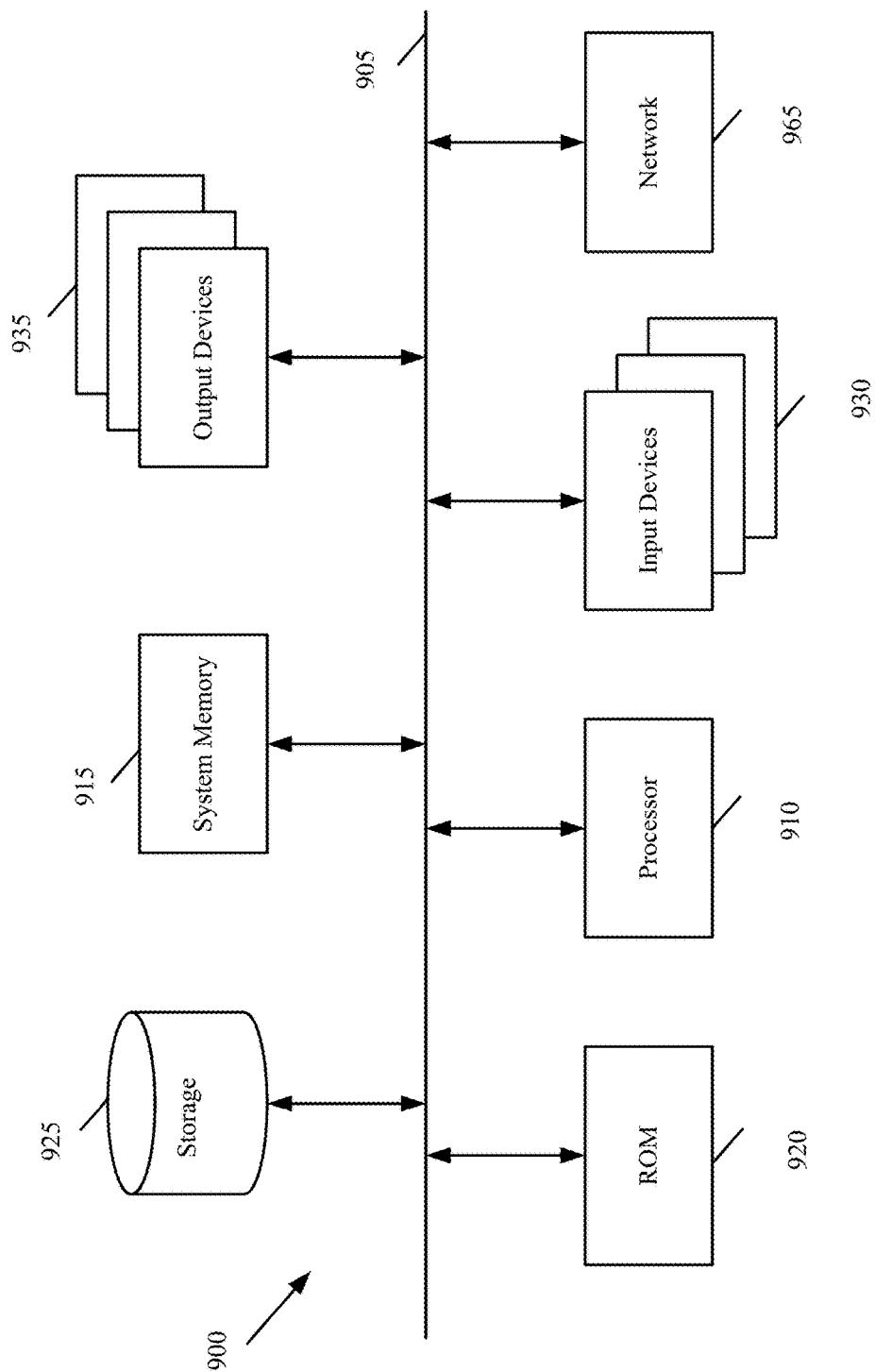
FIG. 9 illustrates a computer system with which some embodiments are implemented.

FIG. 9 illustrates a computer system with which some embodiments are implemented. Such a computer system includes various types of non-transitory computer readable mediums and interfaces for various other types of non-transitory computer readable mediums that implement the various processes and modules described above (e.g., the hosting system, the first set of servers of the hosting system, and the second set of servers of the hosting system). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices (also called "cursor control devices"). The input devices 930 also include audio input devices (e.g., microphones, MIDI musical instruments, etc.). The output devices 935 display images generated by the computer system. The output devices include printers and display devices, such as liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the internet. For example, the computer 900 may be coupled to a content server (network 965) so that a web browser executing on the computer 900 can interact with the content server as a user interacts with a GUI that operates in the web browser.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for identifying a server from a plurality of distributed servers of a hosting system for responding to a user request, the method comprising:
   receiving an original Domain Name System (DNS) request at a DNS recursive name server;
   producing at the DNS recursive name server, a modified DNS request differing from the original DNS request in response to said receiving, wherein said producing comprises propagating from the DNS recursive name server to a different DNS name server, the modified DNS request comprising an Internet Protocol (IP) address of the DNS recursive name server and a particular IP address associated with said user originating said original DNS request, wherein the particular IP address is not an IP address of any DNS server used in resolving the user's DNS request;
   mapping the particular IP address associated with the user to a particular set of performance metrics from a plurality of performance metrics at a DNS authoritative name server of the hosting system receiving the modified DNS request, wherein the plurality of performance metrics measure content delivery performance of the plurality of distributed servers to a plurality of regions, and wherein the particular set of performance metrics measures content delivery performance of the plurality of distributed servers to a specific region for the particular IP address associated with the user;
   updating the particular set of performance metrics in response to the DNS authoritative name server receiving the modified DNS request, wherein said updating comprises distributing monitoring packets from at least two of the plurality of distributed servers in different regions to the particular IP address, and revising the particular set of performance metrics based on results from said distributing; and
   modifying a configuration of the hosting system used in resolving DNS requests comprising IP addresses mapping to the particular set of performance metrics, wherein modifying the configuration comprises changing a DNS response sent from the DNS authoritative name server from providing a first address of a default first server from the plurality of distributed servers to a second address of a different second server from the plurality of distributed servers based on said updating of the particular set of performance metrics, wherein the content delivery performance of the second server to the particular IP address is greater than the content delivery performance of the first server and other servers of the plurality of distributed servers.

2. The method of claim 1 further comprising extracting the particular IP address associated with the user from the modified DNS request.

3. The method of claim 1, wherein modifying the configuration comprises modifying a DNS resolution table or configuration file of said DNS authoritative name server.

4. The method of claim 1, wherein the particular set of performance metrics comprise results of the at least two distributed servers either pinging the particular IP address or tracing routes from the at least two distributed servers to the particular IP address.

5. The method of claim 1 further comprising passing in reply to the modified DNS request, a DNS response comprising an IP address of the second server.

6. The method of claim 5 further comprising receiving at the second server, a content request from the particular IP address.

7. The method of claim 6 further comprising passing content in response to the content request from the second server to the particular IP address.

8. The method of claim 1 further comprising aggregating the plurality of performance metrics from the plurality of distributed servers.

9. An authoritative DNS server for an Anycast based hosting system, the hosting system operating a plurality of distributed servers for content distribution to end users, the authoritative DNS server comprising:
a network interface receiving a modified DNS request from any of a set of DNS servers in a DNS hierarchy operating to resolve the modified DNS request on behalf a user, wherein the modified DNS request deviates from an original DNS request issued by said user by including a first IP address identifying a DNS server in said DNS hierarchy and adding a second IP address identifying the user of the original DNS request, and wherein the authoritative DNS server receives said modified DNS request instead of the original DNS request from said DNS server in said DNS hierarchy;
a memory including program instructions; and
a processor operating responsive to the program instructions to:
obtain based on the second IP address identifying the user in the modified DNS request, performance metrics identifying content delivery performance from an Anycast address of the hosting system and an IP address of a first server from the plurality of distributed servers to said second IP address;
select said Anycast address in response to a different second server from the plurality of distributed servers selected for the second IP address based on Anycast providing faster content delivery performance to the second IP address than the first server as determined from the performance metrics;
pass through the network interface in reply to the modified DNS request, a DNS response resolving said modified DNS request to the Anycast address of the hosting system; and
update said performance metrics in response to passing the second IP address from the authoritative DNS server to a plurality of monitoring servers of the hosting system in different regions and receiving different performance metrics identifying different content delivery performance from the plurality of monitoring servers.

10. The authoritative DNS server of claim 9, wherein the processor further operates responsive to the program instructions to obtain the performance metrics by retrieving the performance metrics from each of the plurality of distributed servers.

11. The authoritative DNS server of claim 9, wherein the processor further operates responsive to the program instructions to initialize a routine on each distributed server causing the distributed server to pass at least one packet to the second IP address and to derive an updated performance metric based on performance associated with passing the at least one packet from the distributed server to the second IP address.

12. The authoritative DNS server of claim 9, wherein the modified DNS request is modified with an extension mechanism expanding the original DNS request with a field carrying said second IP address in addition to standardized DNS request fields.

13. A method for identifying a server from a plurality of distributed servers of a hosting system for responding to a user request, the method comprising:
extracting a first IP address identifying a user issuing an original DNS request from a modified DNS request passing from a DNS server in a DNS hierarchy, wherein said DNS server changes the original DNS request by incorporating said first IP address as part of the modified DNS request;
grouping the user with a set of other users in a particular group based on commonality between the first IP address of said user and IP addressing of the set of other users;
obtaining in response to said first IP address and said grouping, performance metrics measuring content delivery performance from each of the plurality of distributed servers to a second IP address from the particular group that is different than the first IP address;
selecting for the first IP address from the original DNS request, a particular server from the plurality of distributed servers serving content to the second IP address with greater content delivery performance than other servers from the plurality of distributed servers as determined from the performance metrics;
passing a DNS response resolving the DNS request to the particular server; and
tracking new performance metrics for the particular group in response to sending the first IP address from the modified DNS request to the plurality of distributed servers.

14. The method of claim 13, wherein said grouping comprises grouping the user with the set of other users having IP addresses in the same IP address block as the first IP address.

15. The method of claim 13, wherein grouping the user comprises identifying a common network node through which the user and the set of other users receive content from the hosting system.

16. The method of claim 15, wherein identifying the common network node comprises tracing a network path for contacting said first IP address and identifying the second IP address of the common network node in said path for contacting the first IP address of the user and IP addressing for the set of other users.

17. The method of claim 15 further comprising producing said performance metrics by monitoring content delivery performance from each server of the plurality of distributed servers to a device that is addressed by said second IP address.

* * * * *